US012376088B2

United States Patent
Tran et al.

(10) Patent No.: US 12,376,088 B2
(45) Date of Patent: Jul. 29, 2025

(54) INTELLIGENT REAL-TIME CARRIER SELECTION FOR UAVs

(71) Applicant: AT&T Intellectual Property I, L.P., Atlanta, GA (US)

(72) Inventors: Xuan Tuyen Tran, Piscataway, NJ (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 410 days.

(21) Appl. No.: 17/705,589

(22) Filed: Mar. 28, 2022

(65) Prior Publication Data

US 2023/0309072 A1  Sep. 28, 2023

(51) Int. Cl.
*H04W 72/0453* (2023.01)
*H04W 72/52* (2023.01)

(52) U.S. Cl.
CPC ....... *H04W 72/0453* (2013.01); *H04W 72/52* (2023.01)

(58) Field of Classification Search
None
See application file for complete search history.

(56) References Cited

U.S. PATENT DOCUMENTS

| | | |
|---|---|---|
| 10,002,322 B1 | 6/2018 | Ravindran et al. |
| 2011/0176435 A1* | 7/2011 | Khandekar ......... H04W 72/541 370/252 |
| 2014/0254494 A1* | 9/2014 | Clegg ................. H04W 72/541 370/329 |
| 2018/0268491 A1 | 9/2018 | Cuomo et al. |
| 2019/0205881 A1 | 7/2019 | Borzilleri et al. |
| 2019/0340586 A1 | 11/2019 | Sheng et al. |
| 2020/0082389 A1 | 3/2020 | Regev |
| 2020/0084709 A1* | 3/2020 | Niu ................... H04W 74/0833 |
| 2020/0154426 A1* | 5/2020 | Takács .................. B64C 39/024 |
| 2021/0042836 A1 | 2/2021 | Doney et al. |
| 2021/0192619 A1 | 6/2021 | Wu |
| 2021/0219260 A1* | 7/2021 | Kumar .................. H04W 84/02 |
| 2021/0400195 A1 | 12/2021 | Adato et al. |
| 2023/0121609 A1* | 4/2023 | Abhigyan ............ G08G 5/0026 701/3 |
| 2023/0122768 A1 | 4/2023 | Benson |
| 2023/0394488 A1 | 12/2023 | Soryal et al. |

* cited by examiner

*Primary Examiner* — Lonnie V Sweet
(74) *Attorney, Agent, or Firm* — Guntin & Gust, PLC; Mark Wilinski

(57) ABSTRACT

Aspects of the subject disclosure may include, for example, a drone service retrieving network state information describing a network state of at least a portion of a communication network, determining an impact of the network state on operation of an unmanned aerial vehicle (UAV), selecting a carrier frequency to be used for communication by the UAV, and providing the data describing the carrier frequency to the UAV and/or to communication network nodes. Other embodiments are disclosed.

20 Claims, 10 Drawing Sheets

300

INTELLIGENT REAL-TIME CARRIER SELECTION FOR UAVs

FIELD OF THE DISCLOSURE

The subject disclosure relates to communications with Unmanned Aerial Vehicles (UAVs).

BACKGROUND

UAVs are used in a multitude of applications such as parcel delivery, infrastructure monitoring, and real-time video streaming, among others. The nature of communications with UAVs can vary greatly depending on their flight missions. For example, a UAV used for video streaming may use more communication bandwidth than a UAV used for parcel delivery.

BRIEF DESCRIPTION OF THE DRAWINGS

Reference will now be made to the accompanying drawings, which are not necessarily drawn to scale, and wherein.

DETAILED DESCRIPTION

Figure 1:
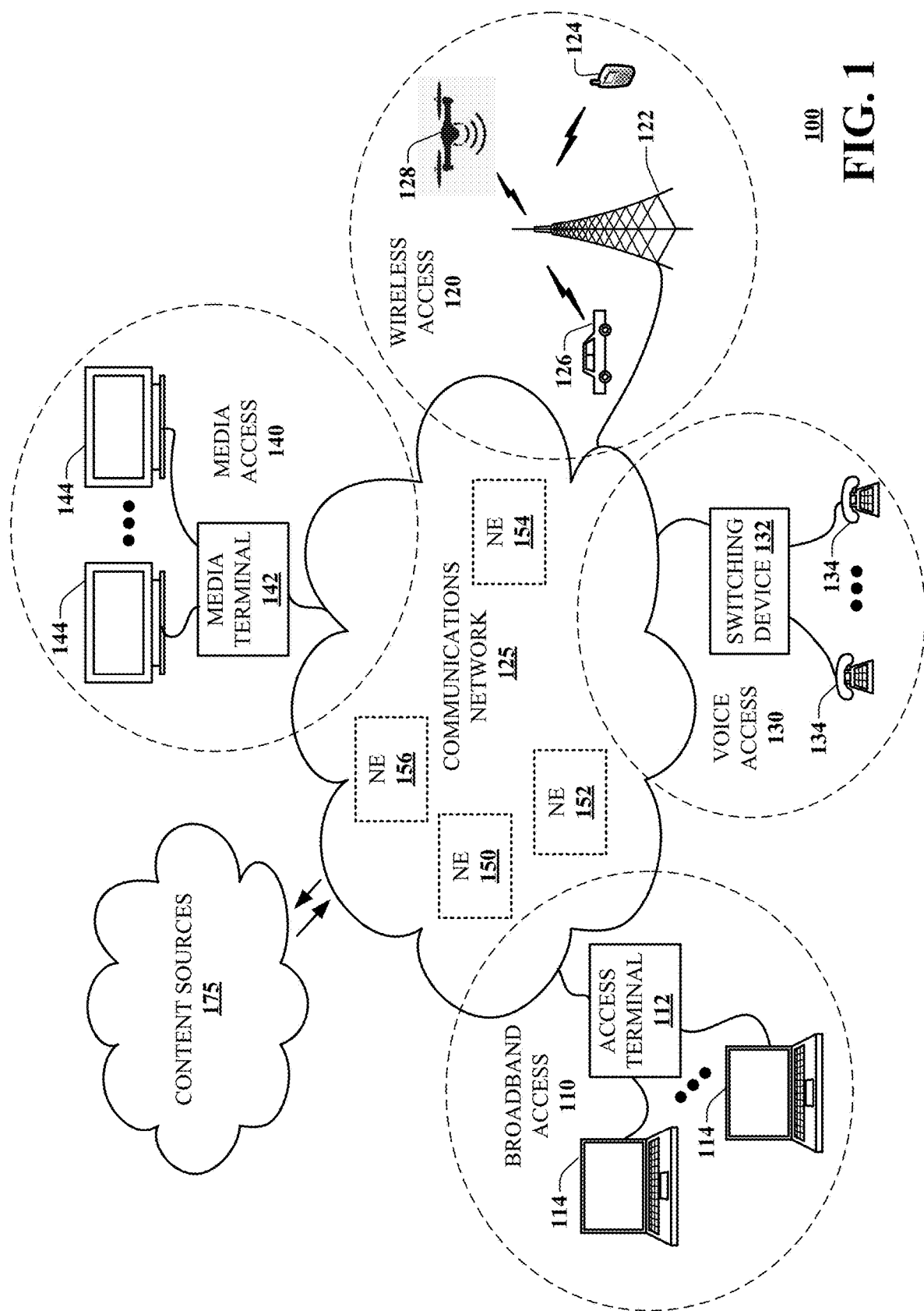
FIG. 1 is a block diagram illustrating an exemplary, non-limiting embodiment of a communications network in accordance with various aspects described herein.

The subject disclosure describes, among other things, illustrative embodiments for managing operations of UAVs that utilize terrestrial communication systems. Other embodiments are described in the subject disclosure.

One or more aspects of the subject disclosure include a device, comprising a processing system including a processor and a memory that stores executable instructions that, when executed by the processing system, facilitate performance of operations. The operations may include retrieving network state information describing a network state of at least a portion of a communication network; determining an impact of the network state on operation of an unmanned aerial vehicle (UAV); and responsive to the impact of the network state on the operation of the UAV, selecting a carrier frequency for communications between the UAV and the communication network.

One or more aspects of the subject disclosure include a non-transitory, machine-readable medium, comprising executable instructions that, when executed by a processing system including a processor, facilitate performance of operations. The operations may include retrieving network state information describing a network state of at least a portion of a communication network; determining an impact of the network state on operation of an unmanned aerial vehicle (UAV); and responsive to the impact of the network state on the operation of the UAV, selecting a carrier frequency for communications between the UAV and the communication network.

One or more aspects of the subject disclosure include a method comprising: retrieving, by a processing system including a processor, network state information describing a network state of at least a portion of a communication network; determining, by the processing system, an impact of the network state on operation of an unmanned aerial vehicle (UAV); and responsive to the impact of the network state on the operation of the UAV, selecting, by the processing system, a carrier frequency for communications between the UAV and the communication network.

Additional aspects of the subject disclosure include receiving operational constraints relating to operation of the UAV, and determining the carrier frequency based at least in part on the network state information and the operational constraints; wherein the operational constraints comprise an altitude; wherein the operational constraints comprise a latitude and a longitude; wherein the network state information describes at least one static attribute of the communication network; wherein the at least one static attribute comprises plurality of carrier frequencies available for communications between the UAV and the communication network; wherein the network state information describes at least one dynamic attribute of the communication network such as a network node load; wherein the determining the impact comprises determining a future impact on the operation of the UAV when the UAV is to be communicatively coupled to the communication network in the future; wherein the network state information comprises expected bandwidth availability at a plurality of network nodes, and the operational information comprises a planned route for the UAV and determining carrier frequencies to be used at cell sites along the planned route; wherein the determining the impact comprises determining a current impact on the operation of the UAV while the UAV is currently communicating with a network node of the communication network; wherein the network state information comprises currently available bandwidth at the network node; wherein the operational information comprises a flight path for the UAV.

Referring now to FIG. 1, a block diagram is shown illustrating an example, non-limiting embodiment of a system 100 in accordance with various aspects described herein. For example, system 100 can facilitate in whole or in part UAV operations. In particular, a communications network 125 is presented for providing broadband access 110 to a plurality of data terminals 114 via access terminal 112, wireless access 120 to one more mobile devices 124, one or more vehicles 126, and/or one or more UAVs 128, via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, data terminal 114 can be provided media content provide by UAV 128, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Various embodiments described herein provide communications with UAVs to support UAV operation in a multitude of applications such as express delivery, infrastructure monitoring, and real-time video streaming, among others. For example, in some embodiments, UAVs are equipped with one or more communication devices (e.g., a cellular device) for connectivity that allows beyond-visual-line-of-sight (BVLOS) operations. UAV connectivity requirements (e.g., bandwidth, latency, etc.) may vary greatly depending on desired flight missions. For example, in some embodiments, a UAV used for video streaming may require a high-bandwidth uplink while covering a targeted area. Also for example, in some embodiments, a UAV used for parcel delivery may only require moderate connectivity for status updating with a ground station. Depending on the applications, the objective of the UAVs in terms of flight duration and trajectory may also be different. For example, in some embodiments, such as when UAVs operate beyond-visual-light-of-sight (BVLOS) with respect to the ground controller, connectivity between the ground controller and the UAV using communication system 125 may be useful and capable of providing wide-band long distance connectivity.

Terrestrial networks such as communication network 125 are typically optimized for terrestrial users whose mobility and channel condition are very different from the UAVs flying at high altitude. Various embodiments described herein provide a closed-loop feedback and control mechanism that may include a network service (referred to herein as a "drone service") that supports UAV operations. In some embodiments, the drone service may communicate with a UAV through a lightweight control channel to frequently read instantaneous state information of the UAV (e.g., current location, heading in the next n-second interval, signal strength, downloading and uploading traffic demand, experienced quality of service, etc.). The drone service may also utilize a set of network application programming interfaces (APIs) to retrieve static and/or dynamic network information describing attributes of the network that is providing (or will provide) communications services to UAVs. Examples of network information may include uplink and downlink available capacity and/or bandwidth, base station coverages, antenna patterns, interference information describing UAV-caused interference at unassociated base stations, and the like. Based on feedback from the network and the UAV, the drone service may utilize intelligent machine learning and optimization techniques to compute operational information useful to the UAV. For example, the drone service may determine operational information such as a suggested trajectory guidance (e.g., flight path) to the UAV, as well as directing the UAV when to more aggressive upload and/or download based on its demand so as to optimize the energy consumption and maximize the throughput.

In some embodiments, the drone service may determine a carrier frequency to be used for communications between the UAV and a communication network. For example, in some embodiments, a base station such as base station 122 may include one or more cell sites that are capable of communicating using one or more carrier frequencies, and the drone service may command one or both of base station 122 and/or UAV 128 to use a particular carrier frequency. These and other embodiments are further described below.

In some embodiments, the drone service may be implemented within, or as part of, a communication system. For example, the drone service may be implemented in a network element such as network element 154. In other embodiments, the drone service may be implemented on an edge cloud that has low-latency access to key performance indicator (KPI) information from the cellular base stations (e.g., LTE eNBs and/or 5G gNBs) such as base station 122. In still further embodiments, the drone service may be implemented as, or within, a virtual network element. These and other embodiments are further described below.

Figure 2A:
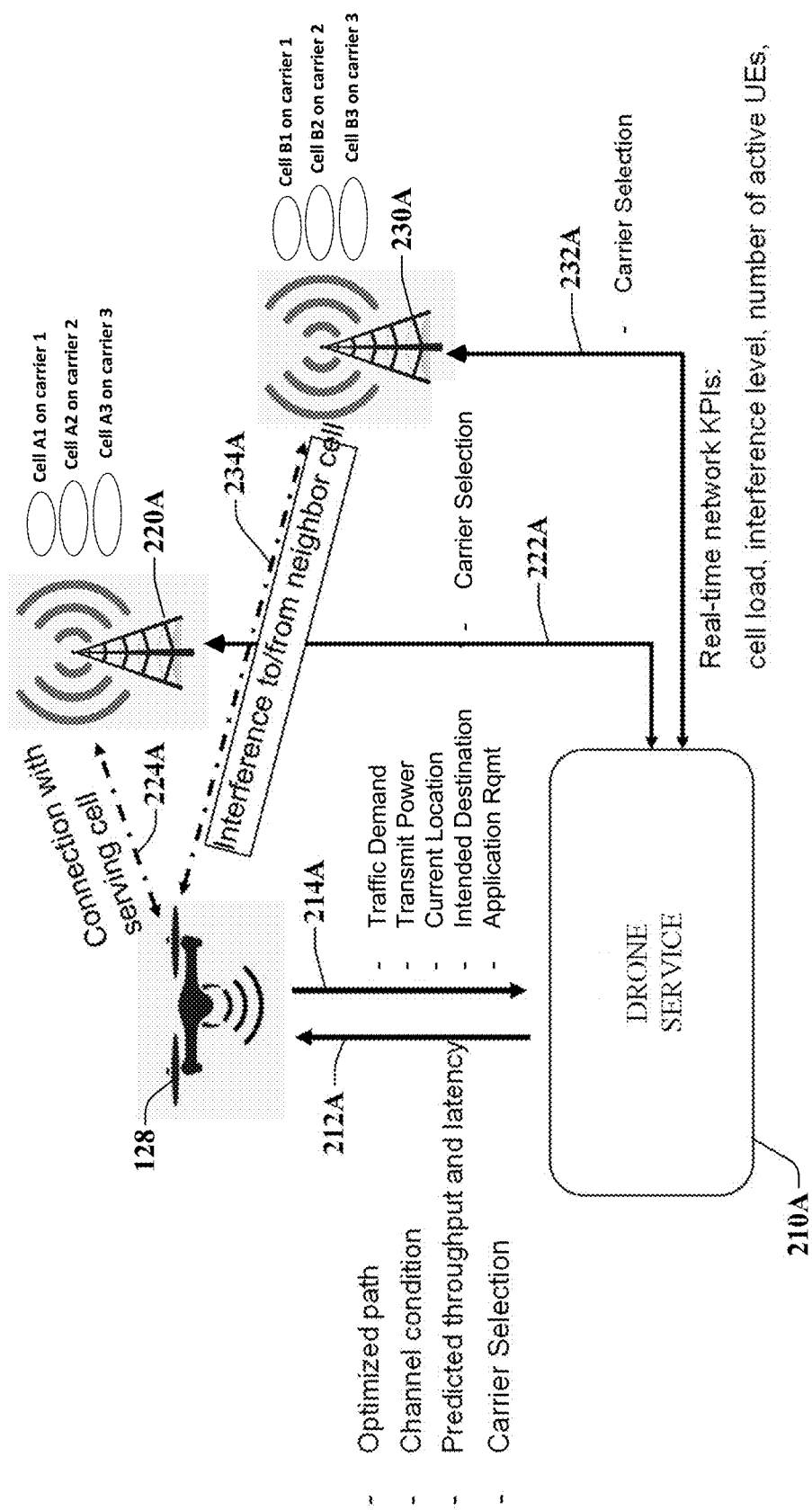
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. FIG. 2A shows system 200A including drone service 210A communicating with UAV 128 and various network resources such as base stations 220A and 230A. In some embodiments, drone service 210A may be implemented as a network element within a communication system such as network element 154 within communication system 125. In other embodiments, drone service 210A may be implemented at an edge of the communication system so as to provide low latency when communicating with particular network resources such as base stations. In still further embodiments, drone service 210A may be implemented in the cloud, such as at an edge network within the cloud. In general, drone service 210A may be implemented in any manner without departing from the scope of the various embodiments.

UAV 128 (also described above with reference to FIG. 1) may be any type of drone capable of supporting any type of flight requirement. For example, in some embodiments, UAV 128 may be designed for parcel delivery, and any single flight may take UAV 128 over a significant distance with a significant payload. Also for example, in some embodiments, UAV 128 may be a surveillance drone that carries one or more sensors such as a camera. In these embodiments, UAV 128 may be dispatched to provide surveillance of an event (planned or unplanned) such as a traffic accident, a concert, or some other gathering. In these embodiments, UAV 128 may record audio or video, or may capture video and stream that video back through the communication system. In these surveillance embodiments, UAV 128 may have different requirements as compared to a delivery drone. For example, when providing surveillance, UAV 128 may not travel over great distances, but may require significantly higher bandwidth. In still further embodiments, UAV 128 may be a drone that provides cell service when in flight. For example, UAV 128 may be equipped with a cellular base station such as base station 122 in order to provide cellular service in areas that are either underserved or overcrowded.

In operation, drone service 210A may access network state information from communications nodes at 222A, 232A describing a network state of at least a portion of a communications network. For example, drone service 210A may access an API that is capable of providing loading conditions for individual base stations. Examples of loading information may include a number of users connected to base station 220A or current bandwidth availability at base station 230A. In some embodiments, the network state information is static information, and in other embodiments, the network state information is dynamic information. Examples of static information include information describing the deployment of the radio access network such as the location of base stations, the number of antennas at base stations, the number of cell sites at a base station, the number of carrier frequencies available at each base station, and antenna patterns. Examples of dynamic information include information describing real-time operation variables such as currently available bandwidth, expected bandwidth, number of users connected to base stations, or any other network information that may be dynamic and that may be useful in the operation of drone service 210A. In some embodiments, the dynamic information is available on a per carrier frequency basis. For example, if a base station supports three carrier frequencies, the dynamic information may include, for each carrier frequency, information such as currently available bandwidth, expected bandwidth, number of users connected to base stations, or any other network information that may be dynamic and that may be useful in the operation of drone service 210A.

Drone service 210A may also access operational constraints relating to operation of UAV 128 at 214A. Examples of operational constraints may include bandwidth requirements, latency requirements, energy usage limits, altitude limits, current location, heading, speed, and application requirements such as delivery or surveillance. Also for example, operational constraints may include information describing which carrier frequencies are supported by UAV 128. In some embodiments, some or all of these operational constraints are retrieved not directly from the UAV, but from a control center or user interface where these constraints are either stored or entered. In some embodiments, these operational constraints are stored on a per UAV basis, and in other embodiments these operational constraints are stored on a per flight basis. In still further embodiments, the operational constraints may be determined using machine learning based on previous UAV flights and other available data.

In some embodiments, drone service 210A may utilize the network state information and any available operational constraints as well as any other information describing the requirements of a UAV flight to determine an impact of the network state on the operation of the UAV. For example, a UAV that has a high bandwidth requirement may be impacted if a flight path for the UAV takes it over a series of base stations with low available bandwidth. Also for example, a surveillance drone may be required to maintain a particular distance from an event while providing surveillance, and one or more available base stations may have already exceeded a maximum number of connections. Also for example, a UAV that supports a limited number of carrier frequencies will be limited to those carrier frequencies when communicating with base stations.

In response to the network state information and any determined impact of the network state on operation of the UAV, drone service 210A may provide operational information to UAV 128. Examples of operational information include one or more carrier frequencies to use, a modified flight path, multiple suggested flight paths, commands to change carrier frequency, latitude, longitude, height, orientation, or the like. For example, if UAV 128 has a requirement for high bandwidth during its flight, drone service 210A may provide a flight path to UAV 128 that takes it over or near base stations with an amount of available bandwidth that satisfies the requirements of UAV 128 while in flight. In other embodiments, drone service 210A may provide a flight path to UAV 128 that satisfies some other constraints such as quality of service, energy usage, and/or flight time. Also for example, drone service 210A may determine multiple possible flight paths, each of which having different bandwidth availabilities and or other criteria, and provide these to UAV 128. UAV 128 may then determine which flight path to take based on its own requirements and/or constraints.

In some embodiments, while in flight, UAV 128 may have a connection with a serving cell or base station. An example is shown in FIG. 2A where UAV 128 is connected to base station 220A at 224A. Depending on many possible factors, such as the height of UAV 128, antenna patterns, antenna orientations, and power levels of the various radios, UAV 128 may unsuspectingly cause interference to an unassociated base station. For example, while communicating with base station 220A at 224A, UAV 128 may cause interference to base station 230A at 234A. In these embodiments, drone service 210A may receive interference information either directly or indirectly from base station 230A and provide operational information to UAV 128 or base station 220A in an attempt to mitigate the interference. Examples of operational information to mitigate interference may include modifying a carrier frequency used for communication, modifying the flight path of UAV 128, modifying the height at which UAV 128 flies, or modifying the latitude and longitude, and/or the orientation of UAV 128. These and other embodiments are further described below.

In the example of FIG. 2A, base station 220A operates three different cell sites at three different carrier frequencies: cell A1 using carrier frequency 1; cell A2 using carrier frequency 2; and cell A3 using carrier frequency 3. Similarly, in the example of FIG. 2A, base station 230A also operates three different cell sites at three different carrier frequencies: cell B1 using carrier frequency 1; cell B2 using carrier frequency 2; and cell B3 using carrier frequency 3. Frequencies 1, 2, and 3 may be any suitable carrier frequencies at which cell sites may operate, and the base stations are not limited to three carrier frequencies as in the example of FIG. 2A.

In one operational example, UAV 128 may be communicating with base station 220A using carrier frequency 1. Drone service 210A may receive, from base station 230A, a report of interference at cell site B1 caused by UAV 128 transmitting using carrier frequency 1. In response, drone service 210A may determine that connection 224A should be changed from carrier frequency 1 to either carrier frequency 2 or carrier frequency 3. In some embodiments, drone service 210A may provide carrier selection information to base station 220A at 222A to cause base station 220A to change the carrier frequency used to communicate with UAV 128. In other embodiments, drone service 210A may provide carrier selection information to UAV 128 at 212A to cause UAV 128 change the carrier frequency used to communicate with base station 220A. In still further embodiments, drone service 210A may provide carrier selection information to both base station 220A at 222A and UAV 128 to cause base station 220A and UAV 128 to coordinate a change in carrier frequency used to communicate with UAV 128.

In the example described in the previous paragraph, a carrier frequency was changed in response to detected interference. In some embodiments, a carrier frequency is selected or changed in response to criteria other than, or in combination with, detected interference. For example, in some embodiments, a carrier frequency may be selected or modified based on desired bandwidth availability and actual bandwidth availability of different carrier frequencies on a particular base station. Also for example, a carrier frequency may be selected or changed based on any other criteria such as an optimized path, channel condition, predicted throughput and/or latency, traffic demand, transmit power, current UAV location, predicted future UAV location, intended UAV destination, an application requirement (e.g., video, parcel delivery), or the like.

Figure 2B:
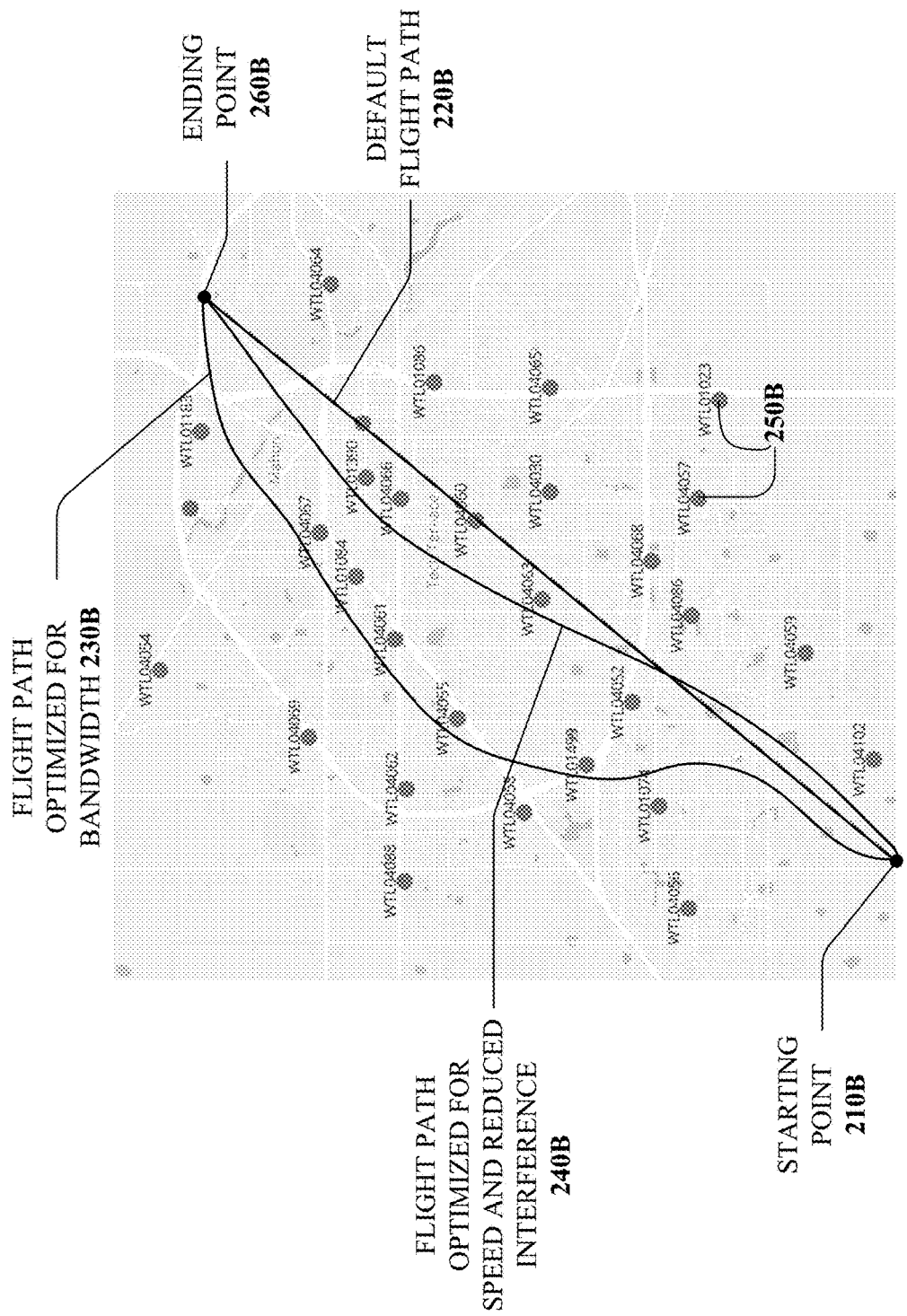
FIG. 2B is a diagram illustrating different UAV flight paths in accordance with various aspects described herein.

FIG. 2B is a diagram illustrating different UAV flight paths in accordance with various aspects described herein.

FIG. 2B shows a map 200B with multiple base stations 250B. Each of these base stations are shown as dots on the map with a prefix of WTL. Base stations 250B correspond to base station 122 (FIG. 1) and base stations 220A and 230A (FIG. 2A). Map 200B also shows multiple UAV flight paths from starting point 210B to ending point 260B. A default flight path 220B is shown as a straight line between starting point 210B and ending point 260V. In some embodiments, a UAV that has a constraint corresponding to starting at point 210B and ending at point 260B may take the shortest distance which corresponds to default flight path 220B. In some embodiments, if a network state of the underlying network that includes base stations 250B does not have any adverse impacts on a UAV following default flight path 220B, then the UAV may follow default flight path 220B from starting point 210B to ending point 260B while still satisfying any constraints of its flight mission. In other embodiments, the drone server may provide one or more additional possible flight paths in order to satisfy any flight constraints based on a current or predicted network state. For example, base stations along default flight path 220B may have limited bandwidth, or may be severely loaded. If the constraints of the UAV flight mission require the UAV to have access to significant bandwidth along the flight path, then the drone server may determine that the current network state will impact the operation of the UAV in that the default flight path 220B may not provide adequate bandwidth for the flight mission of the UAV. In these embodiments, based on network state information that is retrieved, the drone server may determine that the flight path 230B between starting point 210B and ending point 260B may be a suitable substitute for the default flight path 220B because base stations along the flight path 230B have adequate bandwidth to satisfy the flight mission constraints.

Many different possible flight paths may be determined or suggested based on mission constraints for the UAV and the network state. For example, flight path 240B may be determined by the drone service as a suitable flight path optimized for speed and reduced interference. In still further embodiments, the drone service may determine multiple possible flight paths between starting point 210B and ending point 260B and provide these flight paths to a UAV along with network state information that the UAV can expect to encounter along the particular path. For example, flight path 230B might be provided to a UAV with the bandwidth and latency values that the UAV may expect to encounter as it hands off from one base station to the next along flight path 230B. In general, any amount or type of flight constraints may be retrieved, any type or amount of network state information may be retrieved, and any number of flight paths may be determined based on a combination of the flight constraints and the network state. The drone service may provide operational information to a UAV in the form of one or more flight paths optimized for one or more constraints.

In some embodiments, a flight path may be dynamically altered. For example, a UAV with high bandwidth constraints may be provided flight path 230B by a drone service. The drone may then start flying from starting point 210B along flight path 230B. At some point along flight path 230B the drone may encounter a highly loaded base station that does not satisfy the bandwidth constraints, and may report this back to the drone service. The drone service may then dynamically determine, based on instantaneous or more recent collection of network state information, an altered flight path along map 200B two ending point 260B.

In some embodiments, carrier frequency selection may be performed for one or more base stations 250B either during or before a UAV flight. For example, in some embodiments, as a UAV connects to a base station, a drone service may make a carrier frequency selection as described above with reference to FIG. 2A. Also for example, while a UAV is connected to a base station, a drone service may change a carrier frequency selection and cause either the UAV or base station to change the carrier frequency at which the UAV communicates with the base station. In various embodiments, carrier selection is made before a UAV flight. For example, when a flight path is chosen, in some embodiments, a carrier selection is made for one or more base stations that the UAV is predicted to communicate along the flight path. The carrier selection for each base station may be the same for simplicity of UAV operation, or may be made independently for each base station to optimize one or more operational characteristics at each base station. In still further embodiments, a drone service may make carrier frequency selections before a flight, and then dynamically change carrier frequency selections during the UAV flight as described above.

In some embodiments, a flight path may be chosen or modified based on carrier frequencies. For example, in some embodiments it may be desirable to operate a UAV at a particular carrier frequency (e.g., higher frequency to reduce likelihood of causing interference, or lower frequency to increase range), and base stations may be chosen (thereby creating a flight path) based on availability or loading of the desired carrier frequency at each base station. In general any of the selection criteria described above may be utilized when choosing or modifying a flight path based on carrier frequency.

Figure 2C:
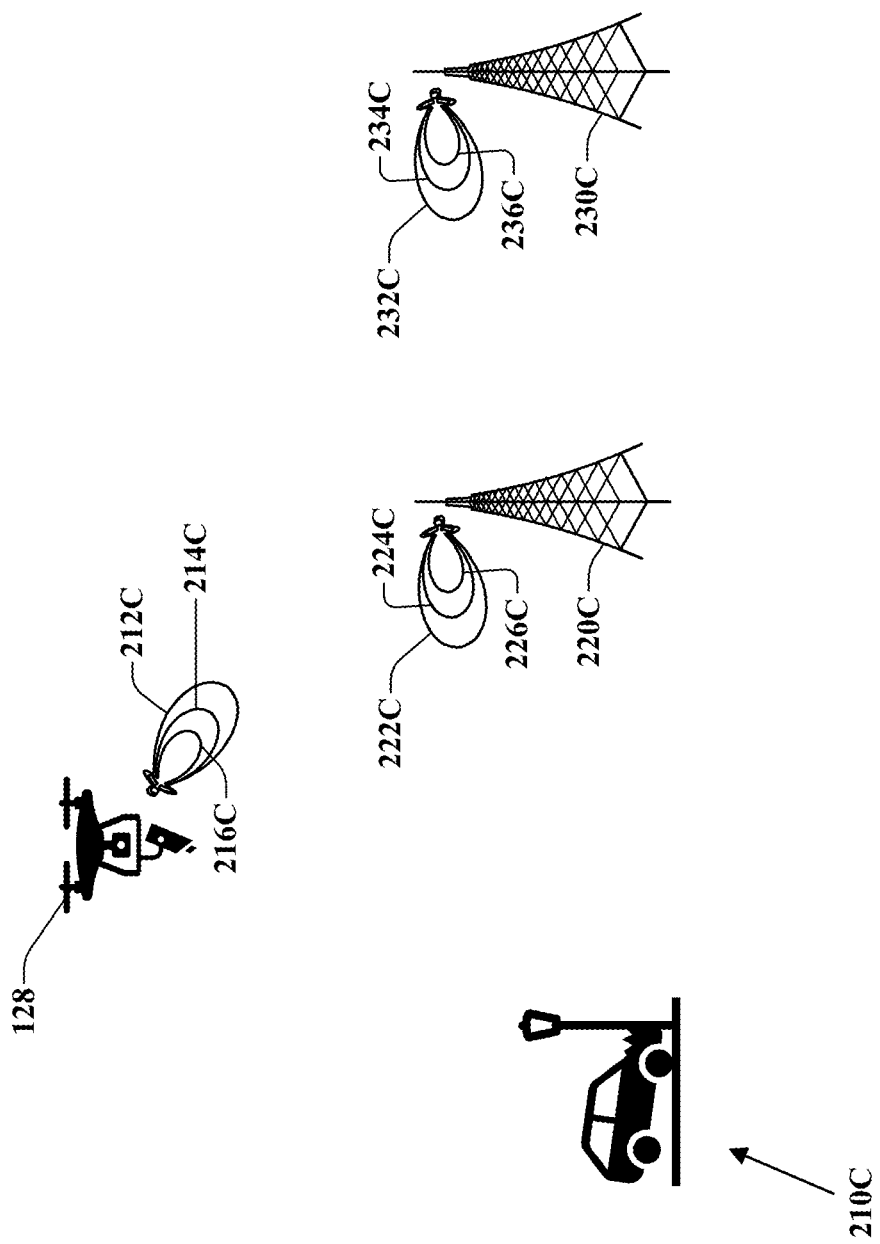
FIG. 2C is a diagram illustrating a UAV communicating with a base station in a communication network in accordance with various aspects described herein.

FIG. 2C is a diagram illustrating a UAV communicating with a base station in a communication network in accordance with various aspects described herein. FIG. 2C shows UAV 128 providing surveillance of a crash scene 210C. FIG. 2C also shows two base stations 220C and 230C, either of which UAV 128 may associate with. The UAV flight mission illustrated in FIG. 2C differs from the flight mission illustrated in FIG. 2B, in that in FIG. 2C UAV 128 does not necessarily need to travel from a starting point to an ending point, but may instead achieve its mission while remaining relatively stationary and performing surveillance.

In the example in FIG. 2C, the drone service may receive operational constraints for the mission of UAV 128 that may include a bandwidth requirement for streaming video of crash scene 210C, a minimum altitude at which UAV 128 may fly, a maximum energy store aboard UAV 128, and the like. The drone service may determine network state information as described above and then may provide operational information to UAV 128. UAV 128 is shown having three antenna patterns 212C, 214C, and 216C. Similarly, base station 220C is shown having three antenna patterns 222C, 224C, and 226C, and base station 230C is shown having three antenna patterns 232C, 234C, and 236C. These antenna patterns are for illustration only, and in general are greatly simplified as compared to real-world antenna patterns. In general, the different antenna patterns different carrier frequencies. For example, antenna patterns 216C, 226C and 236C may correspond to a first carrier frequency, antenna patterns 214C, 224C, and 234C may correspond to a second carrier frequency, and antenna patterns 212C, 222C, and 232C may correspond to a third carrier frequency.

A drone service communicating with one or more of UAV 128 and base stations 220C, 230C may make a carrier frequency selection. For example, UAV 128 may receive information from a drone service commanding UAV 128 to connect to base station 220C using the first carrier frequency corresponding to antenna patterns 216C and 226C. Also for example, UAV 128 may receive information from the drone service commanding UAV to change the carrier frequency used to communicate with base station 220C to the second carrier frequency corresponding to antenna patterns 214C and 224C.

During a surveillance flight mission of UAV 128, UAV 128 may associate with base station 220C to communicate with a Control Center or a media consumer that consumes the streaming media provided by UAV 128. In part because UAV 128 is in the sky and not on the ground, the antenna patterns of the various base stations may not have high gain in the direction of UAV 128. In these embodiments, UAV 128, when associated with base station 220C, may interfere with signals at base station 230C when at a particular altitude, latitude, and longitude, whereas a terrestrial user equipment (UE) at the same latitude and longitude associated with base station 220C may not necessarily interfere with base station 230C. In these embodiments, the drone service may provide operational information to UAV 128 in an effort to mitigate any interference. For example, the drone service may retrieve network state information corresponding to a noise level at base station 230C and then the drone service may provide operational information to UAV 128 to command UAV to change its carrier frequency, altitude, longitude, latitude, or orientation. Then, in some embodiments, the drone service may repeat the collection of noise level information from base station 230C to determine whether any interference has been mitigated. In response, the drone service may take additional actions and provide additional operational information to UAV 128 in an attempt to further mitigate the interference. This may be an iterative process, and may utilize any network state information useful to determine operational information in an effort to mitigate interference.

FIG. 2C also illustrates embodiments in which UAV 128 may provide cell service over an event, either planned or unplanned, that can benefit from cell service in the sky. For example, an event such as a crash scene in a rural area or a concert may benefit from UAV 128 providing cell service from the sky. In these embodiments, the drone service may retrieve operational constraints relating to the operation of UAV 128 as a cell site base station, and may also retrieve network state information that when combined with the operational constraints may have an impact on the mission of UAV 128. As a result, the drone service may provide operational information to UAV 128 to modify the state of UAV 128 as described above with reference to previous embodiments.

Figure 2D:
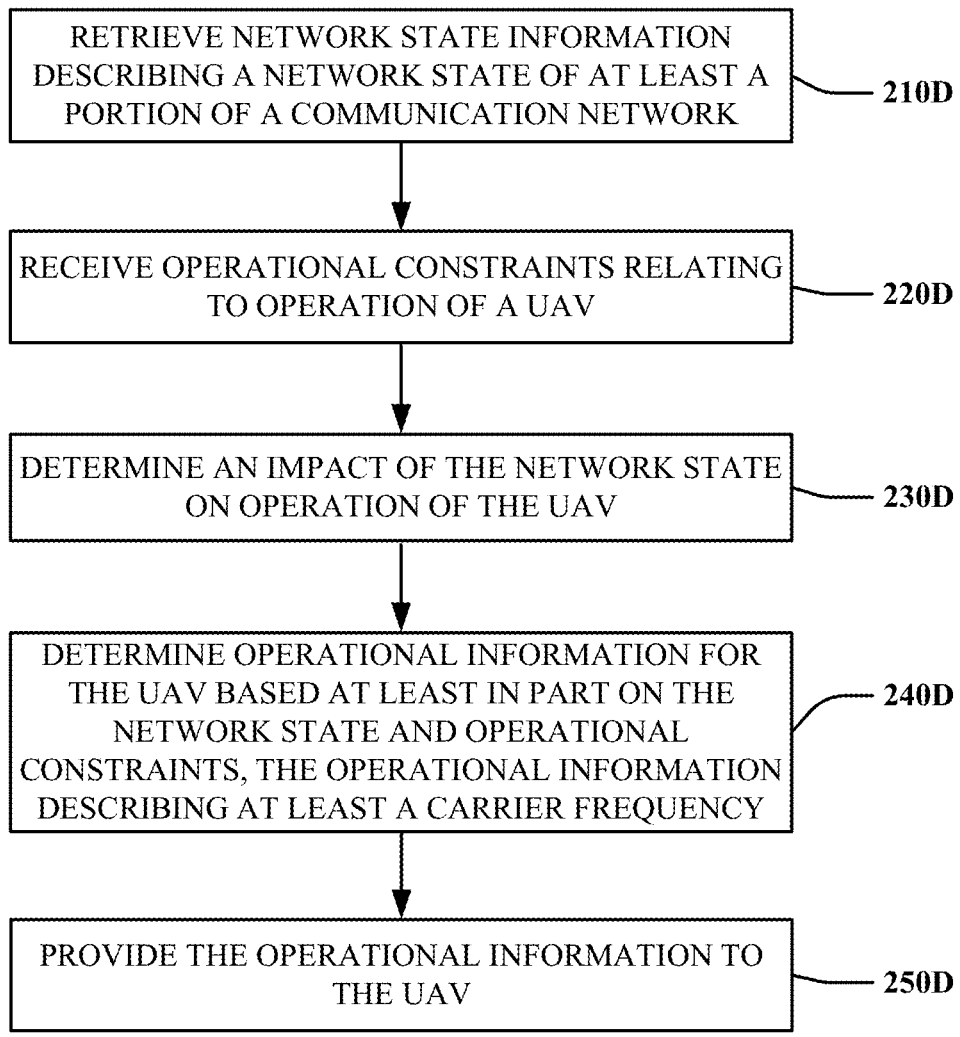
FIGS. 2D and 2E depict illustrative embodiments of methods in accordance with various aspects described herein.
Figure 2E:
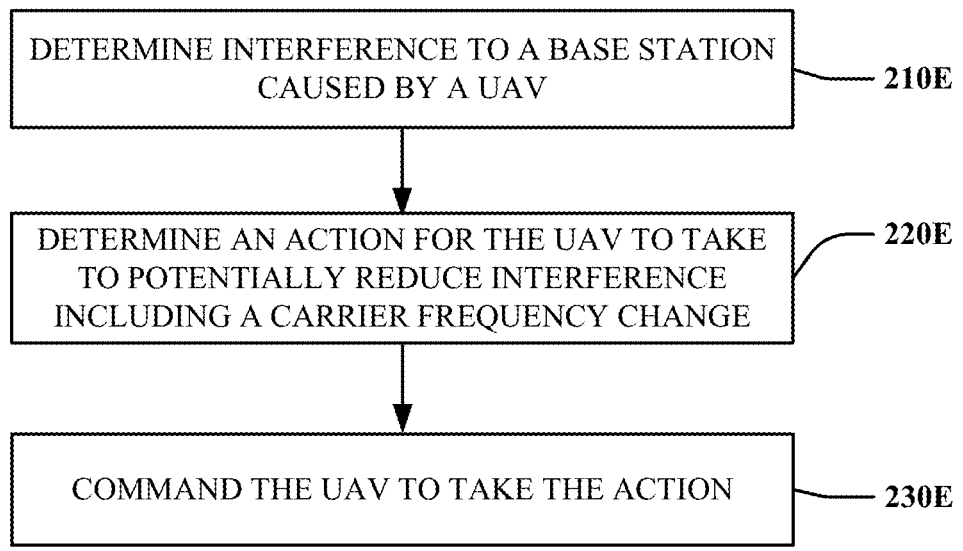

FIGS. 2D and 2E depict illustrative embodiments of methods in accordance with various aspects described herein. At 210D of method 200D, network state information describing a network state of at least a portion of a communication network is retrieved by a drone service. In some embodiments, the drone service is a network element, a virtual network element, or an edge service running on a cloud infrastructure, that has access to network state information of a communication network that is or will be used to communicate with a UAV. In some embodiments, the UAV will operate beyond visual line of sight and the communication system is used to provide both control information to the UAV and to exchange data with the UAV. Examples include retrieving surveillance video from the UAV, retrieving current flight information from the UAV such as speed, altitude, heading, or orientation or exchanging any other control plane or user plane data with the UAV.

In some embodiments, the network state information is retrieved using an API that accesses a store of network state information that is collected from within the communication network. The network state information may also be obtained directly from various sources monitoring the network and providing performance or other data including from the network elements, UEs, and/or UAVs. The network state information may include any information relating to any portion or node of a communication network. For example, the network state information may include loading at a particular base station, loading on a particular carrier frequency of a base station, loading at a particular network node within a communications network, and or any expected future values corresponding to network operation in the future. Specific examples include current bandwidth available using one or more carrier frequencies at one or more base stations, expected future bandwidth available using one or more carrier frequencies at one or more base stations, current latency values using one or more carrier frequencies at one or more base stations, future latency values using one or more carrier frequencies at one or more base stations, the number of associated UEs per carrier frequency at one or more base stations, a future expected number of UEs per carrier frequency at one or more base stations, or any other network state information that may be of use when determining if operational constraints of UAV will be impacted by a network state.

At 220D, operational constraints relating to the operation of a UAV are received. In some embodiments, this corresponds to a drone service receiving operational constraints directly from a UAV. In other embodiments, this corresponds to a drone service receiving operational constraints from a Control Center, a database, or a user interface, or any other device or store capable of providing operational constraints of a UAV flight mission. Examples of operational constraints include one or more carrier frequencies that the UAV is capable of operating on, flight starting points and ending points, minimum and/or maximum altitude values, maximum speed, maximum payload, bandwidth requirements (either in total or over time along the route) latency requirements, or the like.

At 230D an impact of the network state on operation of the UAV is determined, and at 240D, operational information for the UAV is determined based at least in part on the network state and operational constraints, wherein the operational information includes data describing at least one carrier frequency for the UAV to use when communicating with base station(s). In some embodiments, this may include an impact of a predicted network state on the UAV over the course of the flight path which can be updated as additional data is obtained, and which is predicted based on various information including historical network conditions, future scheduled events such as maintenance, and so forth. Also in some embodiments, this corresponds to a drone service determining if the operational constraints of the UAV can be satisfied given the current or future network state described by the network state information retrieved at 210D. For example, a particular operational constraint may include a desired carrier frequency, a minimum bandwidth, and a default flight path may be a straight line between a starting point and ending point. The drone service may determine that the available bandwidth using the desired carrier frequency along the straight line route between the starting point and the ending point is sufficient to satisfy the operational constraints, and determine that there is no impact. In these embodiments, the drone service may inform the UAV to connect to base stations using the desired carrier frequency and to fly along the default flight path and expect to have sufficient bandwidth. Also for example, the drone service may determine that the available bandwidth using the desired carrier frequency along the straight line route between the starting point and the ending point may not have sufficient bandwidth to support the operational constraints of the UAV flight mission. As a result, the drone service may determine that the network state will have an impact on the operation of the UAV, and may take appropriate action. Example actions that the drone service may take may include determining an alternate flight path that satisfies the operational constraints of the UAV mission and/or selecting carrier frequencies on a per base station basis. An example is shown in FIG. 2B in which one flight path is optimized for bandwidth and another flight path is optimized for speed and reduced interference. Along these various flight paths, the same or different carrier frequencies may be used to communicate with different base stations.

At 250D, the operational information is provided to the UAV. In some embodiments, this corresponds to providing a flight path to the UAV, or providing multiple flight paths to the UAV along with constraint information that will allow the UAV or a Control Center to select among the available flight paths. Also in some embodiments, this may correspond to providing a list of carrier frequencies to use to communicate with base stations along a flight path. Also in some embodiments, this may correspond to commanding the UAV to change its altitude, change its latitude and/or longitude, and/or change its power level. This may be in response to determining that the UAV is causing interference to an unassociated base station. This also may be in response to the drone service determining alterations to carrier frequencies or to the flight path while the UAV is flying from a starting point to an ending point.

Referring now to FIG. 2E, at 210E of method 200E, a drone service determines whether a base station is subject to interference caused by a UAV. In some embodiments, this corresponds to a drone service retrieving network state information that describes a noise level at a base station close to, or within range of, a UAV. If the noise level is higher than expected, the drone service may determine that interference to the base station is likely being caused by the nearby UAV. At 220E, the drone service determines an action for the UAV to take to potentially reduce interference. In some embodiments, this corresponds to changing a carrier frequency used by the UAV to communicate with a base station. In other embodiments, this corresponds to reducing a power level of the UAV. In other embodiments, this may correspond to commanding the UAV to reduce its altitude or to change its orientation such that an antenna gain pointing at the base station experiencing interference will be reduced. At 230E, the UAV is commanded to take the action. This may correspond to a drone service communicating with the UAV over a control channel through the communication network. The UAV may be beyond visual line of sight, and connected to the Control Center through the communication network, and the drone service may be able to command the UAV to take action even though the UAV is beyond visual line of sight of the Control Center.

In some embodiments, the actions of FIG. 2E may be iterative. For example, a drone service may determine a noise level at a particular base station, determine an action for the UAV to take, and then command the UAV to take that particular action. The drone service may then collect the same network state information corresponding to noise levels at the base station, and based on a change in the noise level or a lack of change in the noise level, the drone service may determine further actions for the UAV to take and command the UAV to take those particular actions.

While for purposes of simplicity of explanation, the respective processes are shown and described as a series of blocks in FIGS. 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
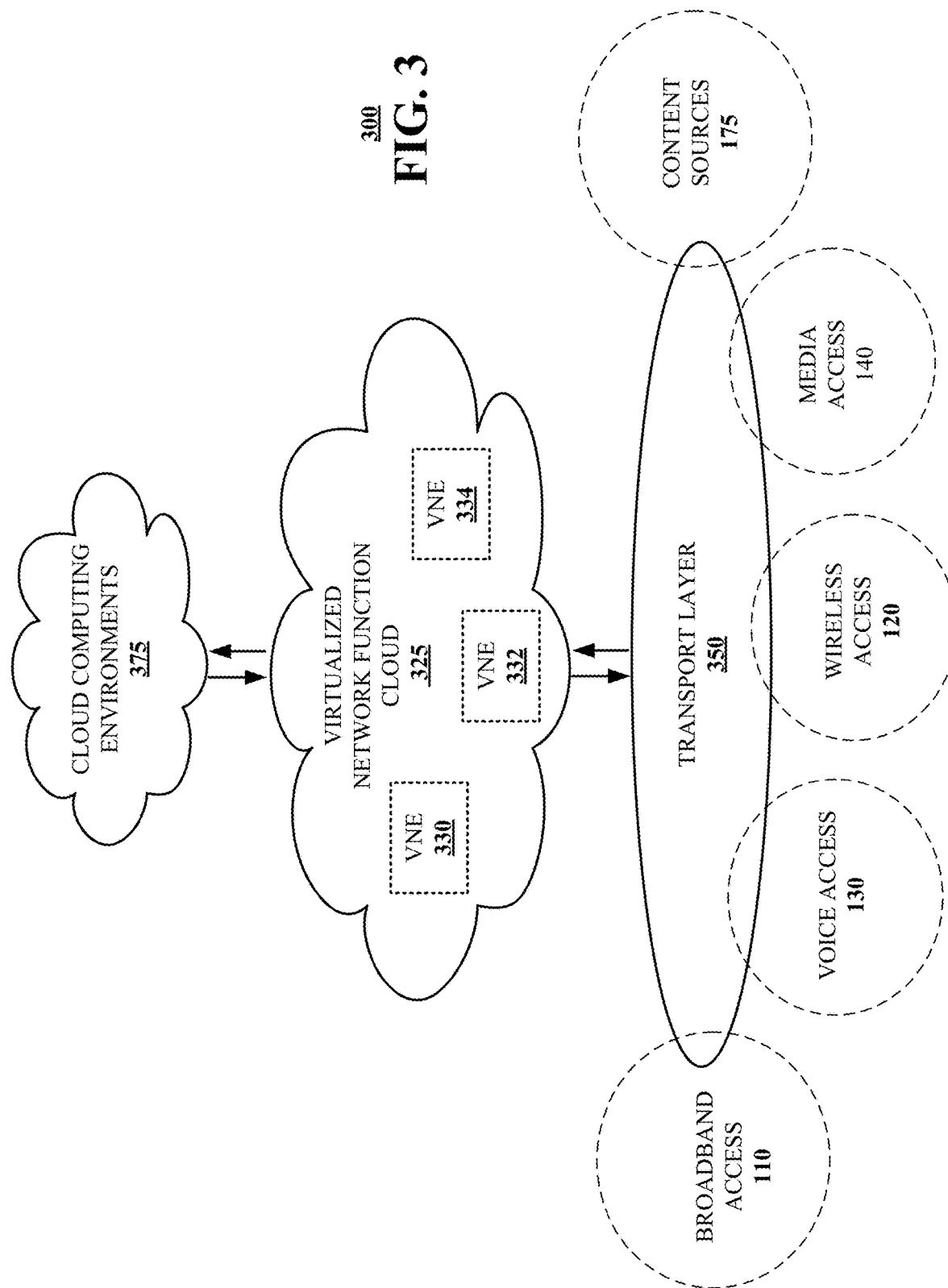
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of systems and methods described with reference to previous figures. For example, virtualized communication network 300 can facilitate in whole or in part the operation of UAVs.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
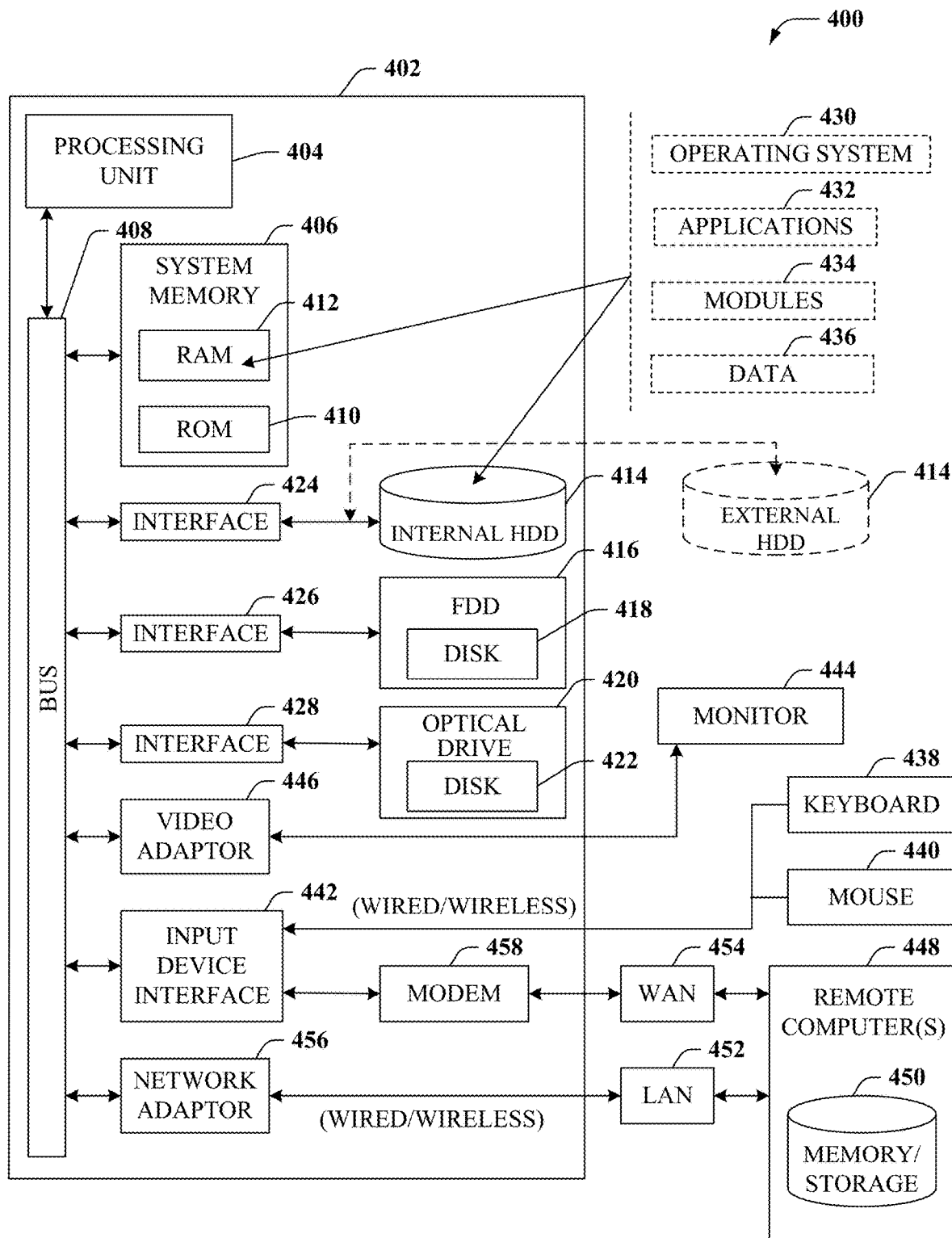
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the operation of UAVs.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
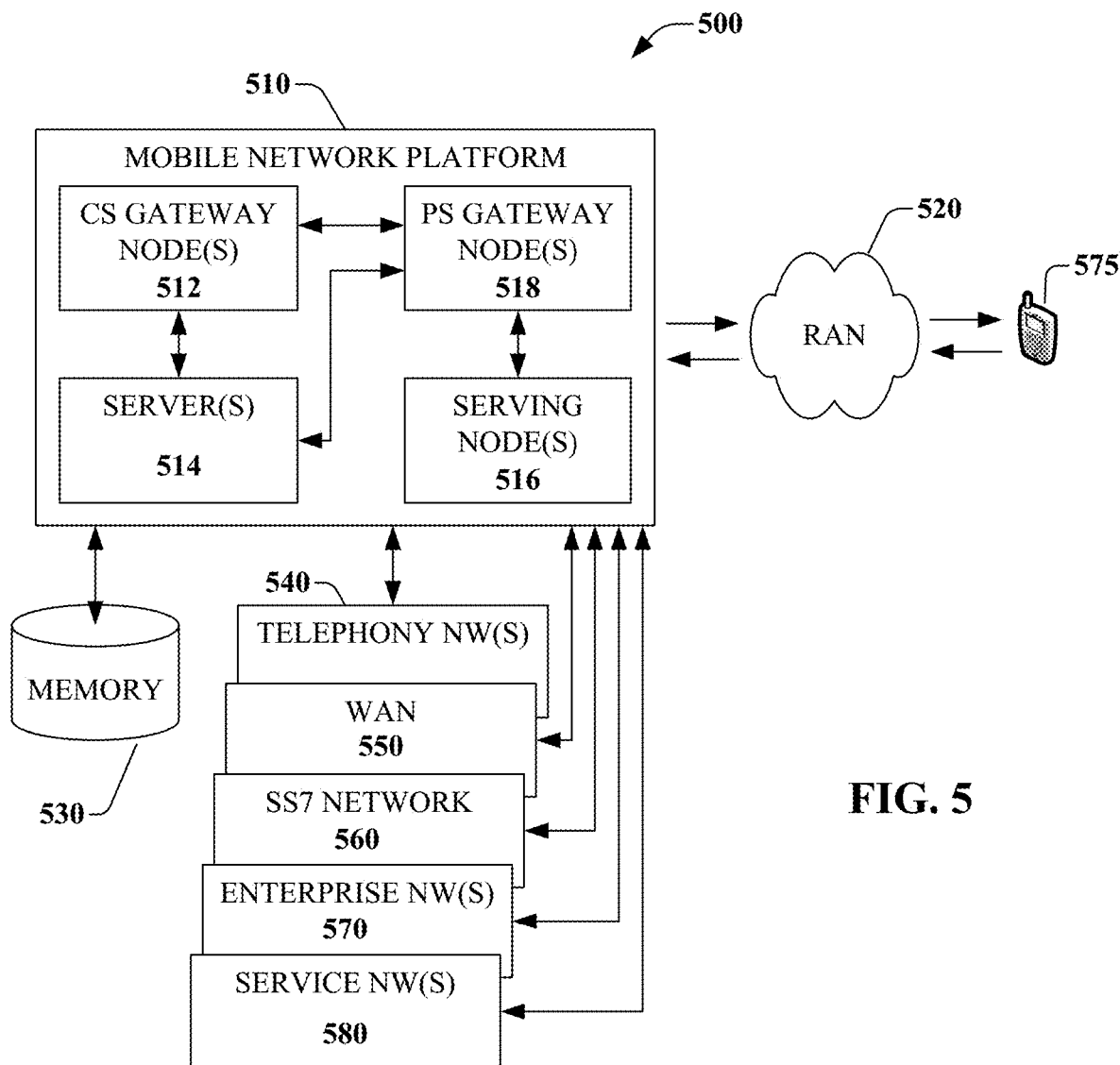
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the operation of UAVs. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500l, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
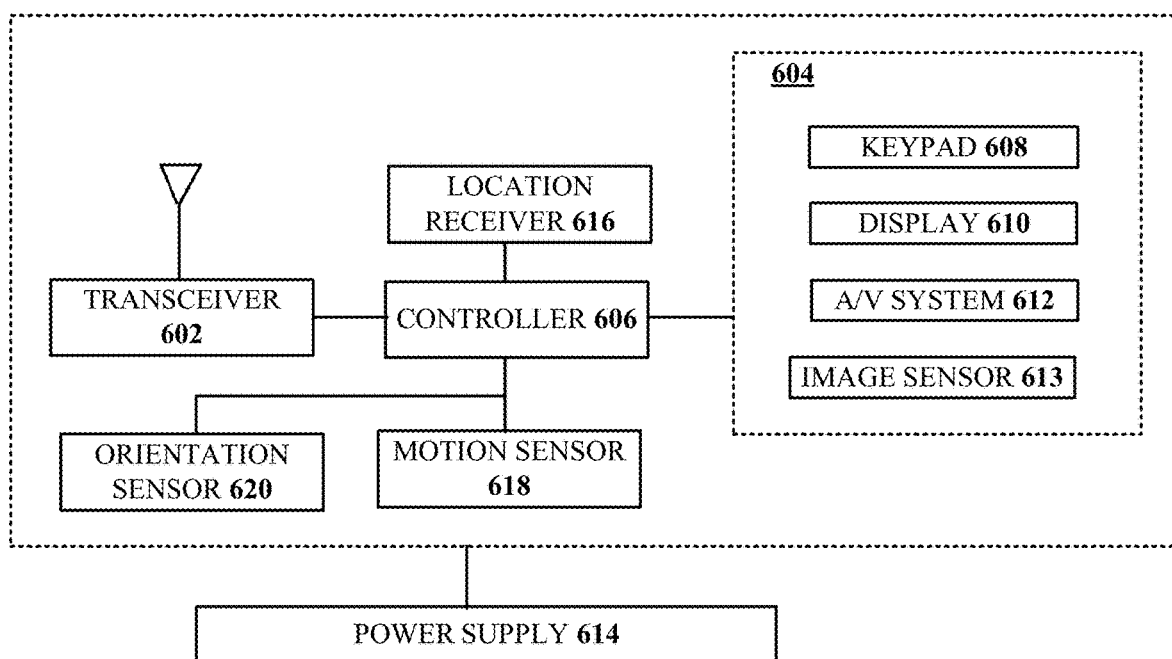
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the operation of UAVs.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        retrieving network state information describing a network state of at least a portion of a communication network, the network state comprising uplink capacity, downlink capacity, base station coverages, antenna patterns, and interference information describing unmanned aerial vehicle (UAV)-caused interference at base stations;
        determining an impact of the network state on operation of a UAV;
        receiving operational constraints relating to operation of the UAV, the operational constraints comprising an energy usage limit; and
        based on the impact of the network state on the operation of the UAV and the operational constraints, selecting a carrier frequency for communications between the UAV and the communication network.

2. The device of claim 1, wherein the operational constraints comprise an altitude.

3. The device of claim 1, wherein the operational constraints comprise a latitude and a longitude.

4. The device of claim 1, wherein the network state information describes at least one static attribute of the communication network.

5. The device of claim 4, wherein the at least one static attribute comprises a plurality of carrier frequencies available for communications between the UAV and the communication network.

6. The device of claim 1, wherein the network state information describes at least one dynamic attribute of the communication network.

7. The device of claim 6, wherein the at least one dynamic attribute comprises a network node load.

8. The device of claim 1, wherein the determining the impact comprises determining a future impact on the operation of the UAV when the UAV is to be communicatively coupled to the communication network in the future.

9. The device of claim 8, wherein the network state information comprises expected bandwidth availability at a plurality of network nodes, and wherein the operations further comprise determining a planned route for the UAV and determining carrier frequencies to be used at cell sites along the planned route.

10. The device of claim 1, wherein the determining the impact comprises determining a current impact on the operation of the UAV while the UAV is currently communicating with a network node of the communication network.

11. The device of claim 10, wherein the network state information comprises currently available bandwidth at the network node.

12. The device of claim 1, wherein the operations further comprise determining a flight path for the UAV.

13. The device of claim 12, wherein the determining of the flight path for the UAV is based on the impact of the network state on the operation of the UAV and the operational constraints, and wherein the operations further comprise directing the UAV as to when to upload data and when to download data so as to reduce energy consumption and enhance throughput at the UAV in accordance with the flight path.

14. A non-transitory, machine-readable medium, comprising executable instructions that, when executed by a processing system including a processor, facilitate performance of operations, the operations comprising:
retrieving network state information describing a network state of at least a portion of a communication network, the network state comprising uplink capacity, downlink capacity, base station coverages, antenna patterns, and interference information describing unmanned aerial vehicle (UAV)-caused interference at base stations;
determining an impact of the network state on operation of a UAV;
receiving operational constraints relating to operation of the UAV, the operational constraints comprising an energy usage limit; and
based on the impact of the network state on the operation of the UAV and the operational constraints, selecting a carrier frequency for communications between the UAV and the communication network.

15. The non-transitory, machine-readable medium of claim 14, wherein the determining the impact comprises determining a future impact on the operation of the UAV when the UAV is to be communicatively coupled to the communication network in the future.

16. The non-transitory, machine-readable medium of claim 15, wherein the network state information comprises expected bandwidth availability at a plurality of network nodes, and wherein the operations further comprise determining a planned route for the UAV and determining carrier frequencies to be used at cell sites along the planned route.

17. A method comprising:
retrieving, by a processing system including a processor, network state information describing a network state of at least a portion of a communication network, the network state comprising uplink capacity, downlink capacity, base station coverages, antenna patterns, and interference information describing unmanned aerial vehicle (UAV)-caused interference at base stations;
determining, by the processing system, an impact of the network state on operation of a UAV;
receiving, by the processing system, operational constraints relating to operation of the UAV, the operational constraints comprising an energy usage limit; and
based on the impact of the network state on the operation of the UAV and the operational constraints, selecting, by the processing system, a carrier frequency for communications between the UAV and the communication network.

18. The method of claim 17, wherein the determining the impact comprises determining, by the processing system, a future impact on the operation of the UAV when the UAV is to be communicatively coupled to the communication network in the future.

19. The method of claim 17, wherein the operational constraints further comprise: a bandwidth requirement, a latency requirement, a current location, a speed, and an application requirement.

20. The method of claim 17, wherein the carrier frequency is associated with a first base station, the method further comprising:
subsequent to the selecting of the carrier frequency, receiving, by the processing system, interference information associated with interference involving a second base station; and
based on the interference information, mitigating, by the processing system, the interference,
wherein the mitigating of the interference comprises modifying the communications between the UAV and the communication network, the modifying including modifying the carrier frequency for the communications.

* * * * *